United States Patent
Nanda

(10) Patent No.: US 7,093,159 B1
(45) Date of Patent: *Aug. 15, 2006

(54) METHOD AND SYSTEM FOR FOUR DISK FAULT TOLERANCE IN A DISK ARRAY

(75) Inventor: Sanjeeb Nanda, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 476 days.

This patent is subject to a terminal disclaimer.

(21) Appl. No.: 10/317,493

(22) Filed: Dec. 12, 2002

(51) Int. Cl.
*G06F 11/00* (2006.01)

(52) U.S. Cl. .............. 714/6; 714/54; 714/770

(58) Field of Classification Search ........... 714/746, 714/6, 5, 67, 114, 762, 767, 770, 781, 54
See application file for complete search history.

(56) References Cited

U.S. PATENT DOCUMENTS

| | | | |
|---|---|---|---|
| 5,115,436 A * | 5/1992 | McAuley | 714/781 |
| 5,303,244 A * | 4/1994 | Watson | 714/5 |
| 5,499,253 A * | 3/1996 | Lary | 714/770 |
| 5,537,567 A * | 7/1996 | Galbraith et al. | 711/114 |
| 5,910,961 A * | 6/1999 | Tolhuizen et al. | 714/762 |
| 6,148,430 A | 11/2000 | Weng | |
| 6,158,017 A * | 12/2000 | Han et al. | 714/6 |
| 6,247,157 B1 * | 6/2001 | Edirisooriya | 714/767 |
| 6,327,672 B1 | 12/2001 | Wilner | |
| 6,353,895 B1 * | 3/2002 | Stephenson | 714/5 |
| 6,636,984 B1 * | 10/2003 | McBrearty et al. | 714/6 |
| 6,745,284 B1 * | 6/2004 | Lee et al. | 711/114 |

\* cited by examiner

*Primary Examiner*—Albert Decady
*Assistant Examiner*—Fritz Alphonse
(74) *Attorney, Agent, or Firm*—W. David Sartor; Beusse Wolter Sanks Mora & Maire, P.A.

(57) ABSTRACT

A two-dimensional parity method and system that provides four-disk fault tolerance in an array of disks, such as a RAID system, is presented. The method includes arranging strips containing data in the disk array into horizontal, diagonal, and stepped parity sets, each parity set including at least one data strip as a member and no single data strip is repeated in any one parity set. The horizontal, diagonal, and stepped parities are than stored in respective disks and stripes of the array. In the event of up to a four simultaneous disk failures, lost data can be reconstructed by using the corresponding stored horizontal, diagonal, and stepped parity information and the data stored on the remaining intact disks.

42 Claims, 4 Drawing Sheets

Disks ($d_i$)

| Stripes | $d_1$ | $d_2$ | $d_3$ | $d_4$ | ... | $d_{N-2}$ | $d_{N-1}$ | $d_N$ | $d_{N+1}$ | $d_{N+2}$ | $d_{N+3}$ | $d_{N+4}$ | $d_{N+5}$ |
|---|---|---|---|---|---|---|---|---|---|---|---|---|---|
| 1 | $S_{1,1}$ | $S_{1,2}$ | $S_{1,3}$ | $S_{1,4}$ | ... | $S_{1,N-2}$ | $S_{1,N-1}$ | $S_{1,N}$ | $hP_1$ | $d1P_1$ | $d2P_1$ | $sP_1$ | $sP_2$ |
| 2 | $S_{2,1}$ | $S_{2,2}$ | $S_{2,3}$ | $S_{2,4}$ | ... | $S_{2,N-2}$ | $S_{2,N-1}$ | $S_{2,N}$ | $hP_2$ | $d1P_2$ | $d2P_2$ | $sP_3$ | $sP_4$ |
| 3 | $S_{3,1}$ | $S_{3,2}$ | $S_{3,3}$ | $S_{3,4}$ | ... | $S_{3,N-2}$ | $S_{3,N-1}$ | $S_{3,N}$ | $hP_3$ | $d1P_3$ | $d2P_3$ | $sP_5$ | $sP_6$ |
| 4 | $S_{4,1}$ | $S_{4,2}$ | $S_{4,3}$ | $S_{4,4}$ | ... | $S_{4,N-2}$ | $S_{4,N-1}$ | $S_{4,N}$ | $hP_4$ | $d1P_4$ | $d2P_4$ | $sP_7$ | $sP_8$ |
| ... | ... | ... | ... | ... | ... | ... | ... | ... | ... | ... | ... | ... | ... |
| M-3 | $S_{M-3,1}$ | $S_{M-3,2}$ | $S_{M-3,3}$ | $S_{M-3,4}$ | ... | $S_{M-3,N-2}$ | $S_{M-3,N-1}$ | $S_{M-3,N}$ | $hP_{M-3}$ | $d1P_{M-3}$ | $d2P_{M-3}$ | $sP_{2M-7}$ | $sP_{2M-6}$ |
| M-2 | $S_{M-2,1}$ | $S_{M-2,2}$ | $S_{M-2,3}$ | $S_{M-2,4}$ | ... | $S_{M-2,N-2}$ | $S_{M-2,N-1}$ | $S_{M-2,N}$ | $hP_{M-2}$ | $d1P_{M-2}$ | $d2P_{M-2}$ | $sP_{2M-5}$ | $sP_{2M-4}$ |
| M-1 | $S_{M-1,1}$ | $S_{M-1,2}$ | $S_{M-1,3}$ | $S_{M-1,4}$ | ... | $S_{M-1,N-2}$ | $S_{M-1,N-1}$ | $S_{M-1,N}$ | $hP_{M-1}$ | $d1P_{M-1}$ | $d2P_{M-1}$ | $sP_{2M-3}$ | $sP_{2M-2}$ |
| M | $S_{M,1}$ | $S_{M,2}$ | $S_{M,3}$ | $S_{M,4}$ | ... | $S_{M,N-2}$ | $S_{M,N-1}$ | $S_{M,N}$ | $hP_M$ | $d1P_M$ | $d2P_M$ | $sP_{2M-1}$ | $sP_{2M}$ |
| M+1 | $d1P_{M+1}$ | $d1P_{M+2}$ | $d1P_{M+3}$ | $d1P_{M+4}$ | ... | $d1P_{M+N-2}$ | $d1P_{M+N-1}$ | $d2P_{M-1}$ | | | | | |
| M+2 | | $d2P_{M+N-1}$ | $d2P_{M+N-2}$ | $d2P_{M+N-3}$ | ... | $d2P_{M+3}$ | $d2P_{M+2}$ | | | | | | |
| M+3 | $sP_{2M+1}$ | $sP_{2M+2}$ | $sP_{2M+3}$ | $sP_{2M+4}$ | ... | $sP_{2M+N-2}$ | | | | | | | |

Fig. 3

METHOD AND SYSTEM FOR FOUR DISK FAULT TOLERANCE IN A DISK ARRAY

BACKGROUND OF THE INVENTION

1. Field of the Invention

The present invention is generally related to disk array architectures, and, specifically, to disk array architectures that provide disk fault tolerance.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array.

In addition, other schemes have been proposed to implement two-disk fault protection, such as the scheme described in U.S. Pat. No. 6,351,838. While these schemes provide fault tolerance in the case of two simultaneous disk failures, the techniques are not readily scalable to accommodate more than two simultaneous drive failures. For example, other schemes require a prohibitively large number of parity disks in relation to the number of data disks or a prohibitively computationally complex recovery algorithm. Importantly, as the number of drives in an array becomes increasingly larger, the statistical probability of more than two disks failing simultaneously increases and, consequently, more than two drive fault tolerance is required. However, it is believed that four drive fault recovery techniques have not been used in disk array architectures or RAID systems.

Thus, it would be desirable to provide system and method for implementing a four-disk fault recovery architecture that is not subject to complex and computationally time-consuming array control functions encountered in known disk fault tolerance implementations. In addition, it would also be desirable to provide a method that does not limit the size or configuration of the array. Further, it would be desirable to limit the number of additional disks required to implement four disk fault tolerance.

BRIEF SUMMARY OF THE INVENTION

Generally, the present invention fulfills the foregoing needs by providing in one aspect thereof, a method for providing up to four disk fault tolerance in an array of disks indexed and organized into a plurality of indexed stripes, each stripe including strips indexed by both disk and stripe, and each of the strips being located on a single disk. The method includes arranging strips containing data into horizontal, diagonal, and "stepped" parity sets, each parity set including at least one data strip as a member and no single data strip being repeated in any one parity set. The method also includes grouping the diagonal parity sets into a first group of diagonal parity sets and a second group of diagonal parity sets so that each data strip is a member of the first and second group. The method further includes calculating a horizontal parity for each horizontal parity set, calculating a diagonal parity for each diagonal parity set, and calculating a stepped parity for each stepped parity set. The method also includes storing the calculated horizontal parity of each horizontal parity set in a strip of a horizontal parity disk. The method further includes storing at least some of the calculated diagonal parities of each diagonal parity set in a corresponding strip of a diagonal parity disk, and storing the remainder of the calculated diagonal parities in a corresponding strip in a diagonal parity stripe so that the diagonal parity is stored in a strip of the diagonal parity stripe with a disk index different from the members of the contributing diagonal parity set. The method also includes storing at least some of the calculated stepped parities of each stepped parity set in a respective one of a plurality of strips of a stepped parity disk and storing a remainder of the calculated stepped parities in a respective one of a plurality of strips in a stepped parity stripe with a disk index different from the members of the contributing stepped parity set.

The present invention further provides, in another aspect thereof, a system for providing disk fault tolerance in an array of independent disks. The system includes an array of disks consecutively indexed and organized into indexed stripes. Each stripe further includes strips indexed by both disk and stripe, and each of the strips in any one of the stripes being located on a single disk. The system further includes an array controller coupled to the disk array and configured to arrange the strips containing data into horizontal, diagonal, and stepped parity sets, each of the sets including at least one data strip as a member. The array controller is also configured to group the diagonal parity sets into a first group of diagonal parity sets and a second group of diagonal parity sets. The array controller is further configured to calculate the corresponding horizontal, diagonal, and stepped parities for each of the parity sets, and to store each of the calculated parities in a corresponding strip.

BRIEF DESCRIPTION OF THE DRAWINGS

The features and advantages of the present invention will become apparent from the following detailed description of the invention when read with the accompanying drawings in which:

FIG. 3 illustrates an exemplary disk array storage format to implement disk fault tolerance using horizontal, diagonal, and stepped parity sets.

Figure 1:
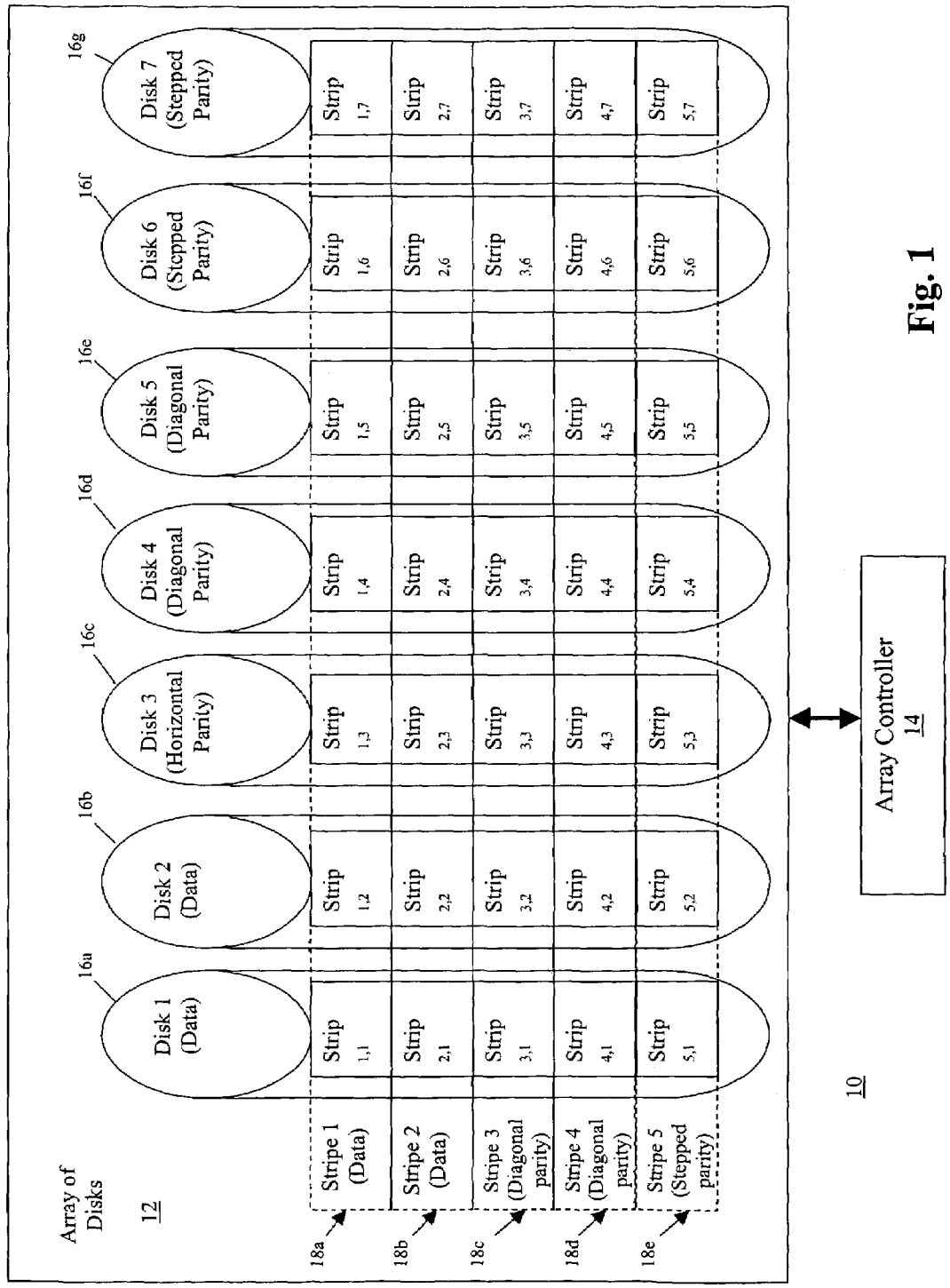
FIG. 1 illustrates a block diagram representation of a data storage system including an array controller and an array of disks.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture. The array controller 14, coupled to array of disks 12, allocates logical units, or strips, into logical rows, or stripes, extending across the physical disks in the array 12. According to one aspect of the invention, each disk in the array 12 is consecutively indexed, each stripe in the array 12 is consecutively indexed, and each strip is indexed according to the corresponding disk and stripe membership. For example, the array 12 depicted in FIG. 1 includes seven disks, disks 1–7 (16a–16g), allocated with five stripes, stripes 1–5 (18a–18e), so that each disk includes five strips indexed by both disk and stripe membership, and each stripe includes seven strips allocated across the disks. Although FIG. 1, for the sake of simplicity of illustration, illustrates a seven disk array 12 having two data disks (16a, 16b) and configured to include five stripes (18a–18e), it will be understood that the present invention is not limited to a specific number of disks (such as the number of data disks being one less than a prime number) and stripes, nor is it limited to a square data disk configuration ("N×N" data disks).

In one aspect of the invention, the array 12 is mapped by the array controller 14 to reserve five disks for storing array reconstruction information. In addition, the mapping includes a reservation of three stripes for storing additional reconstruction information. For example, the highest indexed five disks, disk 3–7 (16c–16g), can be reserved for storing horizontal parity information, diagonal parity information corresponding to a first group of diagonal parity sets, diagonal parity information corresponding to a second group of diagonal parity sets, and stepped parity information, respectively. In addition, stripes 3 and 4 (18c and 18d), can be reserved for storing diagonal parity information corresponding to a first group of diagonal parity sets, and diagonal parity information corresponding to a second group of diagonal parity sets, respectively. The highest indexed stripe, stripe 5, can be reserved for storing stepped parity information. The remaining disks in the array, disks 1 and 2 (16a and 16b), can then be used to store data.

Figure 2:
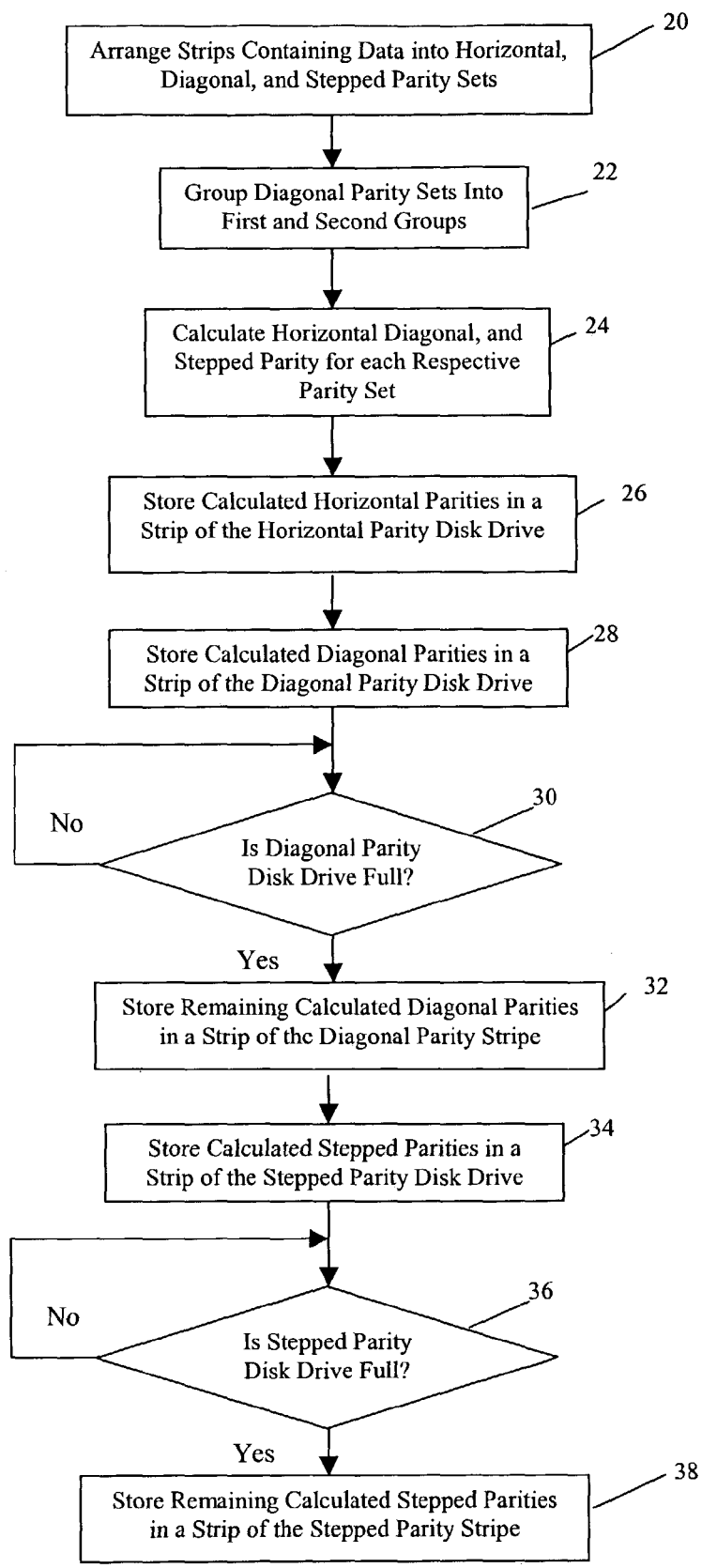
FIG. 2 is a flow chart illustrating a method of providing disk fault tolerance in an array of disks.

FIG. 2 is a flow chart illustrating a method of providing disk fault tolerance in an array of disks allocated as described above. The method can by implemented by the array controller 14, coupled to the array 12, and configured to perform the corresponding method steps. The method includes arranging strips containing data into horizontal, diagonal and stepped parity sets 20. For example, horizontal parity sets can be assembled across each stripe of the array containing data, diagonal parity sets can be assembled across diagonals traversing the stripes in the array that contain data, and stepped parity steps can b assembled in a stair step fashion across the array.

In an aspect of the invention, the diagonal parity sets can be assembled across diagonals traversing the stripes in one direction, and additional diagonal parity sets can be assembled across diagonals traversing the stripes in a different direction. For example, diagonal parity sets can be assembled by establishing a first diagonal parity set as the data strip having the lowest disk and stripe index. Then, consecutive diagonal parity sets can be established by diagonally assembling the data strips adjacent to the previously established diagonal parity set until each data strip has been assembled into a respective diagonal parity set. In another aspect, the diagonal parity sets can be assembled by establishing a first diagonal parity set as the data strip having the highest disk containing data and lowest stripe index. Then, consecutive diagonal parity sets can be established by diagonally assembling the data strips adjacent to the previously established diagonal parity set, proceeding in a lower disk index, higher stripe index direction.

In another embodiment, the stepped parity sets can be assembled in a stair step fashion, such as two strips per tread with a one strip riser, across the stripes in the array that contain data. For example, stepped parity sets can be assembled by establishing a first stepped parity set as the data strip having the lowest disk and stripe index. Then, the next stepped parity set is assembled as the data strip having the lowest disk and lowest stripe index and the data strip having the second lowest disk index and the lowest stripe index to form a two strip "tread." The next stepped parity set includes the data strip having the second lowest disk and lowest stripe index, the data strip having the third lowest disk index and the lowest stripe index (forming another two strip tread), and the data strip having the lowest disk index and the second lowest stripe index, representing an one strip "riser." Stepped parity sets are assembled in this manner until reaching the highest stripe index, highest disk index strip containing data.

In one aspect of the invention, each parity set comprises at least one data strip as a member, and no single data strip is repeated in any one parity set. For example, a single data strip contributes to only one horizontal parity set, only one diagonal parity set, and only one stepped parity set. After the parity sets have been assembled, the diagonal parity sets can be further grouped into a first group of diagonal parity sets corresponding to the diagonal parity sets assembled across diagonals traversing the stripes in one direction, and a second group of diagonal parity sets 22 corresponding to the diagonal parity sets assembled across diagonals traversing the stripes in a different direction. In an aspect of the invention, the parity sets are grouped so that each data strip is a member of both the first and second group.

After the parity sets have been assembled, the parities for each respective parity set are calculated 24 using known parity algorithms. Accordingly, the horizontal parity for each horizontal parity set is calculated using, for example, a simple exclusive (XOR) of the information stored in each member of the horizontal parity set. Similarly, once the diagonal parity sets have been assembled and grouped, the diagonal parities for the first group of diagonal parity sets and the second group of diagonal parity sets can be calculated using known parity algorithms, such as an XOR technique. In addition, once the stepped parities have been assembled, the stepped parities for the stepped parity sets can be calculated using an XOR technique.

After the parities for the horizontal, diagonal, and stepped parity sets are calculated in step 24, the parities are stored in the array so that data and parity information can be reconstructed in the event of a disk failure, such as the loss of four disks simultaneously. In an aspect of the invention, the parities are stored in reserved strips of the array, while the remaining unreserved strips are used for storing data. For example, a disk is reserved to store horizontal parity information, two disks are reserved to store diagonal parity information corresponding to the first and second group of diagonal parity sets, respectively, and two disks are reserved to store stepped parity information. In a further embodiment, two stripes of the array are reserved to store additional diagonal parity information corresponding to the first and second group of diagonal parity sets, respectively. In another aspect, a third stripe of the array is reserved to store additional stepped parity information.

Accordingly, the calculated horizontal parity of each horizontal parity set can be stored in a reserved strip of the horizontal parity disk 26. For example, the horizontal parity for each parity set grouped in a stripe containing data can be stored in a strip of the corresponding stripe of the horizontal parity disk. Next, the calculated diagonal parity of each diagonal parity set is stored in a reserved strip of a diagonal parity disk 28. For example, the diagonal parity for each parity set in the array can be stored in strips of the diagonal parity disks. If the diagonal parity disk is filled 30 before all of the parities of the respective diagonal parity sets have been stored, then the remaining diagonal parities are stored 32 in a strip of a diagonal parity stripe having a smaller disk index than all contributing disk indexes of each data strip of the corresponding diagonal parity set.

In one aspect of the invention, the calculated diagonal parities, beginning with the parity for the first diagonal parity set of the first group, are sequentially stored in respective strips of the diagonal parity disk reserved for the first group. When the diagonal parity strip on the highest indexed stripe containing data is filled, the sequentially calculated diagonal parities are further stored, beginning with the strip on the lowest indexed disk, in the diagonal parity stripe reserved for the first group. This process is continued until the remaining calculated diagonal parities for each of the diagonal parity sets of the first group have been stored.

Similarly, the calculated diagonal parities for the second group, beginning with the strip on the highest indexed disk, are sequentially stored in respective strips of the diagonal parity disk reserved for the second group. When the diagonal parity strip on the highest indexed stripe containing data is filled, the sequentially calculated diagonal parities are further stored (beginning with the strip on the highest indexed disk containing data) in the diagonal parity stripe reserved for the first group. This process is continued until the remaining calculated diagonal parities for each of the diagonal parity sets of the first group have been stored.

Once the calculated diagonal parities have been stored, the calculated stepped parity of each stepped parity set is stored in a reserved strip of a stepped parity disk 34. For example, the stepped parity for each stepped parity set in the array can be stored in strips of the stepped parity disks. If the stepped parity disk is filled 36 before all of the parities of the respective stepped parity sets have been stored, then the remaining stepped parities are stored 38 in a strip of a stepped parity stripe having a smaller disk index than the disk indexes of each contributing data strip of the corresponding stepped parity set.

In one aspect of the invention, the calculated stepped parities, beginning with the parity for the first stepped parity set, are sequentially stored in respective strips of the stepped parity disks. When the stepped parity strips on the highest indexed stripe containing data are filled, the sequentially calculated stepped parities are further stored, beginning with the strip on the lowest indexed disk, in the stepped parity stripe. This process is continued until the remaining calculated stepped parities for each of the stepped parity sets have been stored.

In a further aspect of the invention, the method of assembling, grouping, calculating, and storing of parity sets and the corresponding parities in the array are governed by the following properties:

Property 1—A disk contributes at most one strip to the calculation of a given horizontal, first diagonal, second diagonal, or stepped diagonal parity value Property 2—A first diagonal parity strip appears either on a first diagonal parity disk or on a disk having a smaller disk index than the disk indexes of each data strip of the corresponding diagonal parity set.

Property 3—A second diagonal parity strip appears either on a second diagonal parity disk or on a disk having a larger disk index than the disk indexes of each data strip of the corresponding diagonal parity set.

Property 4—A stepped parity strip appears either on a stepped parity disk or on a disk having a larger disk index than the disk indexes of each data strip of the corresponding stepped parity set.

I. Creating the Logical Data and Parity Array

FIG. 3 illustrates an exemplary disk array storage format to implement disk fault tolerance using horizontal, diagonal, and stepped parity. In the two dimensional arrangement of FIG. 3, a column represents a disk, $d_i$, having index i, with each cell in a column representing a strip in the disk. In addition, $S_{m,n}$ represents a data strip having a data stripe index of m and a data disk index of n, $hP_i$ represents a horizontal parity strip having index i, $d1P_i$ represents a diagonal parity strip corresponding to a first group of diagonal parity sets having index i, and $d2P_i$ represents a diagonal parity strip corresponding to a second group of diagonal parity sets having index i. Strips labeled in the form $sP_i$ represent stepped parity strips having index i.

The rows in FIG. 3 represent the stripes in the array. In an aspect of the invention, the first N disks are data disks, and the last five disks (N+1, N+2, N+3, N+4, N+5) are parity disks. For example, disk N+1 is used to store horizontal parity, hP, disks N+2 and N+3 are used to store diagonal parities, d1P and d2P, respectively, and disks N+4 and N+5 are used to alternately store the stepped parities, sP. In another aspect of the invention, the first M stripes in the array are used to store data, and stripes M+1 and M+2, which include the next to last two strips on each of the first N data disks, are used to store additional diagonal parity information. In particular, stripe M+1 is used to store parity for the first group and stripe M+2 is used to store parity for the second group. In a further aspect, the last strips on each of the first N−1 data disks (located in stripe M+3), are used to store additional stepped parity information. Accordingly, disks 1 to N are used for storing data in stripes 1 to M.

In one aspect of the invention, each horizontal parity set is arranged from the data stored in each stripe. The parity for each of the horizontal sets is stored in the corresponding strip of the respective stripe in the horizontal parity disk. For example, the first horizontal parity set is assembled as $S_{1,1}$ to $S_{1,N}$, and the parity for the set is stored in strip $hP_1$. In another aspect of the invention, diagonal parity sets are arranged across diagonals traversing stripes containing data, and the parity for each of the diagonal groups is stored in a strip in a diagonal parity disk and, when the diagonal parity disk is full, the remaining parities are stored in a diagonal parity stripe. For example, the first diagonal parity set of the first diagonal parity group is assembled as $S_{1,1}$, and the parity for the set is stored in strip $d1P_1$. The second diagonal parity set is assembled as $S_{2,1}$ and $S_{1,2}$ and the parity for the set is stored in strip $d1P_2$. The next adjacent data strips are assembled diagonally, and the process continues until the diagonal parity disk for group is filled (i.e., diagonal parities for diagonal parity sets up to index M.) For the next diagonal parity set, (i.e., diagonal parity group having index M+1) the diagonal parity is stored in a strip of the first diagonal parity stripe so that all the contributing data strips of the diagonal parity set are at least one strip to the right of the strip used to store the diagonal parity for that set. The process of filling the diagonal parity stripe continues in this manner until the parities for the remaining diagonal parity sets for the first group are stored. (i.e., the diagonal parity set ending with set $S_{M,N}$).

Similarly, the first diagonal parity set of the second diagonal parity group is assembled as $S_{1,N}$ and the parity for the set is stored in strip $d2P_1$. The second diagonal parity set is assembled as $S_{1,N-1}$ and $S_{2,N}$ and the parity for the set is stored in strip $d2P_2$. The next adjacent data strips are assembled diagonally, and the process continues until the diagonal parity disk for group is filled (i.e., diagonal parities for diagonal parity sets up to index M.) For the next diagonal parity set, (i.e., diagonal parity group having index M+1) the diagonal parity is stored in a strip of the second diagonal parity stripe so that all the contributing data strips of the diagonal parity set are at least one strip to the left of the strip used to store the diagonal parity for that set. The process of filling the diagonal parity stripe continues in this manner until the parities for the remaining diagonal parity sets for the second group are stored. (i.e., the diagonal parity set ending with set $S_{M,1}$).

In a further aspect of the invention, the parities for each parity set are calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set of the first group, the diagonal parity, $d1P_i$, is calculated according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-N+2,N-1} \oplus S_{i-N+3,N-2} \oplus \ldots S_{i,1}, \text{ for } N < i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

For each diagonal parity set of the second group, the diagonal parity, $d2P_i$, is calculated according to the equations:

$$d2P_i = S_{1,N-i+1} \oplus S_{2,N-i+2} \oplus S_{3,N-i+3} \oplus \ldots S_{i,N}, \text{ for } i \leq N;$$

$$d2P_i = S_{i-N+1,1} \oplus S_{i-N+2,2} \oplus S_{i-N+3,3} \oplus \ldots S_{i,N}, \text{ for } N < i \leq M; \text{ and}$$

$$d2P_i = S_{i-N+1,1} \oplus S_{i-N+2,2} \oplus S_{i-N+3,3} \oplus \ldots S_{M,M+N-i}, \text{ for } M < i < M+N;$$

where i is an index counter for the number of stripes containing data, $S_{i,j}$ is the information stored in strip i of disk j, N is the number of disks containing data in the array, and M is the number of stripes containing data in the array.

Figure 4:
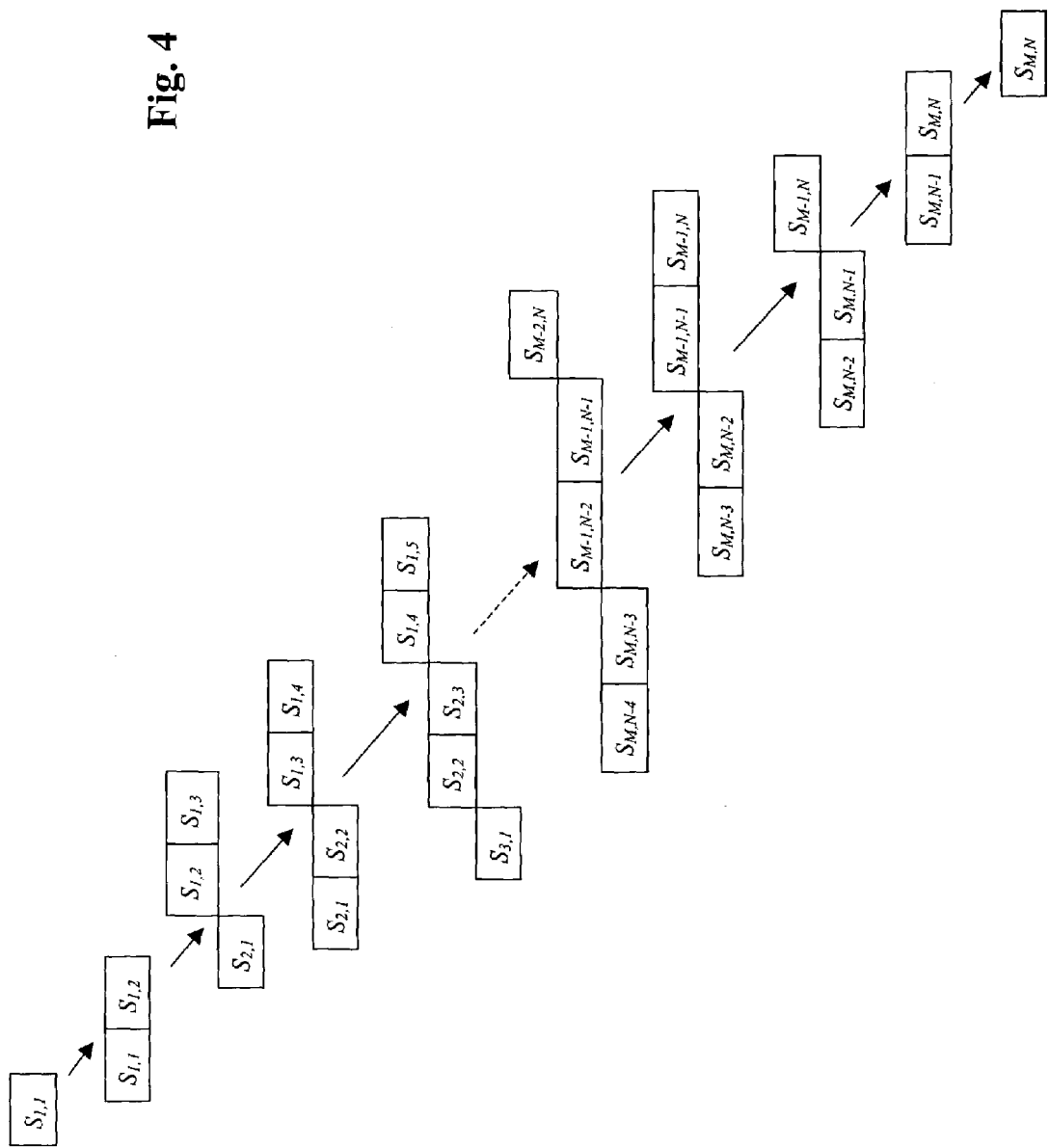
FIG. 4 illustrates an exemplary method of grouping data in the array format of FIG. 3 into stepped parity sets.

In another aspect of the invention, stepped parity sets are arranged in a stair step pattern traversing stripes containing data. FIG. 4 illustrates an exemplary method of grouping data in the array format of FIG. 3 into stepped parity sets. For example, the stepped parity sets can be arranged to form stepped parity sets having a two strip "tread" and a one strip "riser." The parity for each of the stepped parity sets is stored in a strip in a stepped parity disk and, when the stepped parity disks are both full, the remaining parities are stored in a stepped parity stripe. In an aspect of the invention, the stepped parities are alternately stored in a first stepped parity disk and second stepped parity disk, and the remaining stepped parities are stored in the stepped parity stripe.

As shown in FIG. 4, the first stepped parity set is assembled as $S_{1,1}$, and the parity for the set is stored in strip $sP_1$ of the first stepped parity disk. The second stepped parity set is assembled as $S_{1,1}$ and $S_{1,2}$ and the parity for the set is stored in strip $sP_2$ of the second stepped parity disk. The third stepped parity set is assembled as $S_{1,2}$ and $S_{1,3}$ and includes a second tread in the form of $S_{2,1}$. The parity for the third stepped parity set is stored in strip $sP_3$ of the first stepped parity disk. The data strips are progressively assembled into stepped parity sets in a higher disk, higher stripe indexed direction as shown in FIG. 4. The parities for each of the stepped parity sets are calculated and alternately stored in the first and second stepped parity disks until the stepped parity disks are filled to stripe M (i.e., stepped parities for stepped parity sets up to index 2M.)

For the next stepped parity set, (i.e., stepped parity set having index 2M+1) the stepped parity is stored in a strip of the first stepped parity stripe so that all the contributing data strips of the stepped parity set are at least one strip to the right of the strip used to store the stepped parity for that set. The process of filling the stepped parity stripe continues in this manner until the parities for the remaining stepped parity sets for the first group are stored. (i.e., the stepped parity set having index 2M+N−2, ending with strip $S_{M,N}$).

In a further aspect of the invention, the stepped parities are calculated using the XOR of the information in each data strip of the stepped parity set according to the following formulas. For each stepped parity set, the stepped parity, $sP_i$, is calculated according to the equations:

$sP_i = B_{1,i} \oplus B_{2,i-2} \oplus B_{3,i-4} \oplus \ldots B_{p,q}$ if $1 \leq i \leq N$, $sP_i = B_{r,i} \oplus B_{r+1,i-2} \oplus B_{r+2,i-4} \oplus \ldots B_{p,q}$ if $N < i \leq 2M$, $sP_i = B_{r,1} \oplus B_{r+1,i-2} \oplus B_{r+2,i-4} \oplus \ldots B_{M,u}$ if $2M < i < 2M+N-1$, where i is an index counter for the number of stepped parity sets arranged in the array, N is the number of disks containing data in the array, M is the number of stripes containing data in the array, $B_{i,k} = S_{i,k}$ if $k=1$, $B_{i,k} = S_{i,k} \oplus S_{i,k-1}$ if $1 < k \leq N$, $B_{i,k} = S_{i,k-1}$ if $k = N+1$, $S_{i,k}$ is the data stored in strip i of disk k, $p = (i+1)\text{div } 2$, $q = (i-1) \bmod 2 + 1$, $r = (i-N+2)\text{div } 2$, $t = N + (N+i) \bmod 2$, and $u = (i-2M)+2$.

In yet another aspect of the invention, the horizontal, diagonal, and stepped parity disks can be positioned to the left or right of the N data disks. In addition, the stripes containing parity may be positioned above or below the data stripes. Thus, a variety of formatting schemes using horizontal, diagonal, and stepped parities can be used by one skilled in the art to create the fault tolerant disk array using the techniques of the invention, provided the required properties are incorporated in the scheme.

II. Recovering Data and Parity in the Array

Once the data is stored in the array according to the previous section, data and parity can be efficiently recovered for disk failure events, such as the simultaneous failure of four disks in the array. By using the stored horizontal parity, the stored diagonal parity, and the remaining data on the disks, the information on failed disks can be efficiently and quickly recreated. While the sections below describe techniques for the failure recovery of any four disks simultaneously in the array, one skilled in the art can apply the techniques to the simultaneous failure of three or fewer disks in the array. The following sections describe the possible failure modes of any four of the disks in the array and the procedures to be followed in reconstructing the data and parity stored on the failed disks.

A. Failure of any Four Parity Disks

In the case of the failure of any four of the parity disks (i.e., the horizontal parity disk, the diagonal parity disks, or the stepped parity disks), the reconstruction of the parities for the four disks is straightforward. Because the data disks remain intact, the corresponding parities can be regenerated and stored in the respective parity disk according to a pre-failure configuration. For example, the horizontal parity for each horizontal parity set can be recalculated and restored, the diagonal parity for each diagonal parity set can be recalculated and restored in the respective diagonal parity disk, and the stepped parity for each stepped parity set can be recalculated and restored in the respective stepped parity disk.

B. Failure of a Data Disk and any Three Parity Disks

In the case of the failure of a data disk and any three parity disks, reconstructing the lost data includes reconstructing each of the data strips of the failed data disk, starting with the strip on the lowest indexed stripe, by using the corresponding parity information from the two intact (non-failed) parity disks, the parity information on the parity stripes, and the other data members of the corresponding parity sets. Once the failed disk is restored, the parities for the failed parity disks can be recalculated from the intact data disks stored in the appropriate parity disk and parity stripe.

Regardless of which three parity disks fail, there are two parity disks remaining that, in conjunction with the last three stripes of the array of disks, contain at least one complete set of parities—horizontal (hP), diagonal (d1P or d2P) or stepped (sP)—required to rebuild disk $d_i$. None of the parities located on the last three strips of disk $d_i$ can be derived from data on $d_i$ itself (according to properties 2, 3 and 4 described previously) because members of the parity sets whose parity is stored on disk $d_i$ are located either to the left or right of $d_i$. Thus, the parity information from which disk $d_i$ can be reconstructed is located entirely on the two remaining parity disks, regardless of which two parity disks remain intact, and the last three stripes of the functioning data disks. Once the failed disk $d_i$ has been reconstructed, the three damaged parity disks can be reconstructed because all the data disks required for recalculating the parities on the failed parity disks are now intact.

C. Failure of Two Data Disks and Two Parity Disks

If two data disks and two parity disks fail simultaneously, then there are three parity disks remaining that, in conjunction with the last three stripes of the array of disks, contain at least two complete set of parities—horizontal (hP), diagonal (ldP or rdP) or stepped (sdP). Reconstruction of the failed data disks is based on the nature of the remaining parity sets. Once the two failed data disks have been recreated, the damaged parity disks can be easily recreated from data on the intact and restored data disks.

1. One Horizontal and One Diagonal Disk or Stepped Parity Disks Intact a. First Diagonal or Stepped Parity Disks Intact In the case of two failed data disks (where one disk has a lower index, and the other disk has a higher index) and two failed parity disks, where the first diagonal parity disk or both stepped parity disks remain intact, data is reconstructed by starting at the strip on the lowest indexed stripe of the lower index failed data disk and the strip on the lowest indexed stripe of the higher index failed data disk. Data is then recreated in each of the failed disks by alternately reconstructing the data strips of the lower and higher indexed failed data disks. If the first diagonal parity group is intact, then each data strip on the lower indexed failed data disk is recreated by using the corresponding intact diagonal parity and other members of the corresponding diagonal parity sets of the first group. Alternatively, if the stepped parity disks are intact, then each data strip on the lower indexed failed data disk is recreated by using the corresponding stepped parity set that includes the data strip being recreated with a higher disk index than the other data strip of the corresponding stepped parity set on the same stripe (if one exists). The data strip of the higher indexed failed data disk is then reconstructed by using the corresponding horizontal parity and the other members of the corresponding horizontal parity set. The process is alternately repeated until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus $i < k$. The data in each failed disk is alternately reconstructed starting with strip $S_{1,i}$ using the corresponding diagonal parity information of the first group (if intact) or, alternatively, the stepped parity for the stepped parity set that contains $S_{1,i}$ as the rightmost member if the stepped parity disk is intact. This is possible because the strips contributing to the first diagonal parity or the stepped parity for $S_{1,i}$ all occur to the left of disk $d_i$ or on the corresponding first diagonal parity disk or stepped parity disk. Then, strip $S_{1,i}$ is reconstructed using the corresponding horizontal parity information. Next, strip $S_{2,i}$ is reconstructed using the corresponding diagonal parity information of the first group or the stepped parity, followed by strip $S_{2,k}$ using the corresponding horizontal parity information.

For any row index of r, the diagonal parity information of the first group or the stepped parity information required to reconstruct strip $S_{r,i}$ is guaranteed to be available because the strips on data disks needed to reconstruct the parity information are in rows less than r on disks to the right of strip $S_{r,i}$ and on rows greater than r on disks to the left of strip $S_{r,i}$. At this point, the only unavailable data strip required for this purpose is found on disk $d_k$. However, since disk $d_k$ is located to the right of disk $d_i$, the required data strip would have been already reconstructed using the described technique before arriving at strip $S_{r,i}$. Furthermore, the diagonal parity strip or the stepped parity strip required to reconstruct strip $S_{r,i}$ is either located on the first diagonal parity disk (or the stepped parity disks) or is located on a disk to the left of $S_{r,i}$, wherein the required disks are intact. Once all the data strips have been reconstructed, the corresponding parity strips are recreated as needed and the failed parity disks are recreated using the members of the corresponding parity sets.

b. First Diagonal and Stepped Parity Disks Failed

In the case of two failed data disks (where one disk has a lower index, and the other disk has a higher index), a failed first diagonal parity disk, and failed stepped parity disks, data is reconstructed by starting at the strip on the lowest indexed stripe of the higher index failed data disk, and the strip on the lowest indexed stripe of the lower index failed data disk. Data is then recreated in each of the failed disks by alternately reconstructing the data strip of the higher indexed failed data disk by using the corresponding diagonal parity and the other members of the corresponding diagonal parity set of the second group. The data strip of the lower indexed failed data disk is then reconstructed by using the corresponding horizontal parity and the other members of the corresponding horizontal parity set. The process is alternately repeated, until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus i<k. The data in each failed disk is alternately reconstructed starting with strip $S_{1,k}$ using the corresponding diagonal parity information of the second group. This is possible because the strips contributing to the diagonal parity for $S_{1,k}$ all occur to the right of disk $d_k$, or on the second diagonal parity disk, wherein all contributing strips are intact. Next, strip $S_{1,i}$ is reconstructed using the corresponding horizontal parity information. Then, strip $S_{2,k}$ is reconstructed using the corresponding diagonal parity information of the second group, followed by reconstruction of strip $S_{2,i}$ using the corresponding horizontal parity information. At this point, the diagonal parity information of the second group required to reconstruct strip $S_{r,k}$ for some arbitrary r<N+M, is guaranteed to be available since the strips on data disks needed to reconstruct strip $S_{r,k}$ are in rows less than r on disks to the left of strip $S_{r,k}$ and on rows greater than r on disks to the right of strip $S_{r,k}$. Now, the only unavailable data strip required for this purpose is located on disk $d_i$. However, since disk $d_i$ is located to the left of disk $d_k$, the required data strip would have been already reconstructed using described technique before arriving at strip $S_{r,k}$. Furthermore, the diagonal parity strip required to reconstruct strip $S_{r,k}$ is either located on the second diagonal parity disk or located on a disk to the right of $S_{r,k}$ wherein the disks are intact. Once all the data strips have been reconstructed, the corresponding parity strips are recreated as needed and the failed parity disks are recreated using the members of the corresponding parity sets.

2. At Least Two Disks of the Diagonal and Stepped Parity Sets Intact a. Second Diagonal Parity Disk Intact In the case of two failed data disks (where one disk has a lower index, and the other disk has a higher index), a failed horizontal parity disk, and either a failure of the first diagonal parity disk or the failed stepped parity disks, data is reconstructed by starting at the strip on the lowest indexed stripe of the higher index failed data disk, and the strip on the lowest indexed stripe of the lower index failed data disk. Data is then recreated in each of the failed disks by alternately reconstructing the data strip of the higher indexed failed data disk by using the corresponding diagonal parity and the other members of the corresponding diagonal parity set of the second group. The data strip of the lower indexed failed data disk is then reconstructed by using the corresponding diagonal parity and the other members of the corresponding diagonal parity set of the first group (if the stepped parity disks are failed), or the corresponding stepped parity and the other members of the corresponding stepped parity set (if the first diagonal parity disk has failed). The process is alternately repeated, until each data strip in each of the failed disks is reconstructed. Once the failed data disks have been reconstructed, the failed parity disks and the parity strips of the failed data disks can be recreated using the members of the corresponding parity set that is now intact.

In FIG. 3 for example, the disk having a lower index is designated as $d_i$, and the disk having a higher index is designated $d_k$. Thus i<k. The data in each failed disk is alternately reconstructed starting with strip $S_{1,k}$ using the corresponding diagonal parity information of the second group. This is possible because the strips contributing to the diagonal parity for $S_{1,k}$ all occur to the right of disk $d_k$, or on the second diagonal parity disk, wherein all contributing strips are intact. Next, strip $S_{1,i}$ is reconstructed using the corresponding diagonal parity and the other members of the corresponding diagonal parity set of the first group (if the stepped parity disks have failed), or the corresponding stepped parity and the other members of the corresponding stepped parity set (if the first diagonal parity disk has failed). Then, strip $S_{2,k}$ is reconstructed using the corresponding diagonal parity information of the second group, followed by reconstruction of strip $S_{2,i}$ using the corresponding first diagonal parity set or the stepped parity set, depending of which parity disk is intact. In general, the diagonal parity information of the second group required to reconstruct strip $S_{r,k}$ for some arbitrary row index value of r is guaranteed to be available since the strips on data disks needed to reconstruct strip $S_{r,k}$ are in rows less than r on disks to the left of strip $S_{r,k}$ and on rows greater than r on disks to the right of strip $S_{r,k}$. Now, the only unavailable data strip required for this purpose is located on disk $d_i$. However, since disk $d_i$ is located to the left of disk $d_k$, the required data strip would have been already reconstructed using described technique before arriving at strip $S_{r,k}$. Furthermore, the diagonal parity strip required to reconstruct strip $S_{r,k}$ is either located on the second diagonal parity disk or located on a disk to the right of $S_{r,k}$ wherein the disks are intact. Once all the data strips have been reconstructed, the corresponding parity strips are recreated as needed and the failed parity disks are recreated using the members of the corresponding parity sets.

D. Failure of Three Data Disks and any One Parity Disk

1. Failed Stepped Parity Disk

In the case of three failed disks, where one disk has a low index, one disk has an intermediate index and one disk has a high index, and a failed stepped parity disk, data is reconstructed by starting at the strip on the lowest indexed stripe of the low index failed data disk, the strip on the lowest indexed stripe of the high index failed data disk, and the strip on the lowest index stripe of the intermediate index failed data disk. Data is then recreated by reconstructing the data strip of the low index failed data disk by using the corresponding diagonal parity and the other members of the corresponding diagonal parity set of the first group. Then, the data strip of the high index failed data disk is reconstructed by using the corresponding diagonal parity and the other members of the corresponding diagonal parity set of the second group. Next, the data strip of the intermediate index failed data disk is reconstructed by using the corresponding horizontal parity and the other members of the corresponding horizontal parity set. This process is repeated in a fixed cyclic order until each data strip in each failed disk is reconstructed. Once the failed data disks have been reconstructed, the failed parity disks and the parity strips of the failed data disks can be recreated using the members of the corresponding parity set that is now intact.

In FIG. 3 for example, the disk having a low index is designated as $d_i$, the disk having the intermediate index is designated $d_j$, and the disk having the high index is designated $d_k$. Accordingly, $i<j<k$. The data in each failed disk is reconstructed starting with strip $S_{1,i}$ using the diagonal parity information of the first diagonal group. This is possible because the strips contributing to the diagonal parity for $S_{1,i}$ all occur to the left of disk $d_i$ or on the first diagonal parity disk, wherein the necessary disks are intact. Then, strip $S_{1,k}$ is reconstructed using the corresponding diagonal parity information of the second group. Again, this is possible because the strips contributing to the diagonal parity for $S_{1,k}$ all occur to the right of disk $d_k$ or on the second diagonal parity disk, wherein the required disks are all intact. At this point, strip $S_{1,j}$ is reconstructed using the horizontal parity information.

Similarly, strip $S_{2,i}$ is reconstructed using the corresponding diagonal parity information of the first group, strip $S_{2,k}$ is reconstructed using the corresponding diagonal parity information of the second group and strip $S_{2,j}$ is reconstructed using the horizontal parity information (in that order). In general, the diagonal parity information of the first group required to reconstruct strip $S_{r,i}$ and the right diagonal parity information of the second group required to reconstruct strip $S_{r,k}$ are guaranteed to be available for the following reason. For the strip $S_{r,i}$, the strips on data disks needed to reconstruct $S_{r,i}$ are in rows less than r on disks to the right of the strip $S_{r,i}$ and on rows greater than r on disks to the left of strip $S_{r,i}$. The only unavailable data strips required for this purpose can be located on disks $d_j$ and $d_k$. However, since disks $d_j$ and $d_k$ are located to the right of disk $d_i$, the required data strips would have been already reconstructed using the process described before arriving at strip $S_{r,i}$. Furthermore, the diagonal parity strip required to reconstruct strip $S_{r,i}$ is either located on the corresponding diagonal parity disk, or is located on a disk to the left of strip $S_{r,i}$, wherein the necessary disks are intact.

Similarly, the strips on data disks needed to reconstruct $S_{r,k}$ are in rows greater than r on disks to the right of strip $S_{r,k}$ and on rows less than r on disks to the left of strip $S_{r,k}$. The only unavailable data strips required for this purpose can be located on disks $d_i$ and $d_j$. However, since disks $d_i$ and $d_j$ are located to the left of disk $d_k$, the required data strips would have been already reconstructed using the described process before arriving at strip $S_{r,k}$. Furthermore, the diagonal parity strip required to reconstruct strip $S_{r,k}$ is either located on the corresponding diagonal parity disk or is located on a disk to the right of strip $S_{r,k}$, wherein the necessary disks are intact. Once the failed data disks are reconstructed, the strips on the failed stepped parity disk can be restored using the reconstructed data on the disks. Finally, the parity strips on the disks $d_i$, $d_j$ and $d_k$ are reconstructed using the appropriate data strips that are intact.

2. Failed Diagonal Parity Disk a. Failed Diagonal Parity Disk of the First Group In the case of three failed disks, where one disk has a low index, one disk has an intermediate index and one disk has a high index, and a failed diagonal parity disk of the first group, data is reconstructed by starting at the strip on the lowest indexed stripe of the low index failed data disk, the strip on the lowest index stripe of the intermediate index failed data disk, and the strip on the lowest indexed stripe of the high index failed data disk. Data is then recreated by reconstructing the data strip of the low index failed data disk by using the corresponding stepped parity and the other members of the corresponding stepped parity set that contains the data strip to be reconstructed with a higher disk index in comparison to the other member that is on the same stripe (if present). Then, the data strip of the high index failed data disk is reconstructed by using the corresponding diagonal parity and the other members of the corresponding diagonal parity set of the second group. Next, the data strip of the intermediate index failed data disk is reconstructed by using the corresponding horizontal parity and the other members of the corresponding horizontal parity set. This process is repeated in a fixed cyclic order until each data strip in each failed disk is reconstructed. Once the failed data disks are reconstructed, the strips on the failed diagonal parity disk of the first group can be restored using the reconstructed data on the disks. Finally, the parity strips on the failed data disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, $i<j<k$. The data in each failed disk is reconstructed starting with strip $S_{1,i}$ using the stepped parity of the stepped parity set having the strip $S_{1,i}$ as its rightmost member. This is possible because the strips contributing to the stepped parity for $S_{1,i}$ all occur to the left of disk $d_i$ or on the first stepped parity disks, wherein the necessary disks are intact. Then, strip $S_{1,k}$ is reconstructed using the corresponding diagonal parity information of the second group. Again, this is possible because the strips contributing to the diagonal parity for $S_{1,k}$ all occur to the right of disk $d_k$ or on the second diagonal parity disk, wherein the required disks are all intact. At this point, strip $S_{1,j}$ is reconstructed using the horizontal parity information.

Similarly, strip $S_{2,i}$ is reconstructed using the corresponding stepped parity of the stepped parity set containing the strip $S_{2,i-1}$ as a member when $i>1$, strip $S_{2,k}$ is reconstructed using the corresponding diagonal parity information of the second group, and strip $S_{2,j}$ is reconstructed using the horizontal parity information (in that order). In general, for an arbitrary row index value of r, the stepped parity information required to reconstruct strip $S_{r,i}$ and the diagonal parity information of the second group required to reconstruct strip $S_{r,k}$ are guaranteed to be available. For the strip $S_{r,i}$, the strips on data disks needed to reconstruct $S_{r,i}$ are in rows less than r on disks to the right of the strip $S_{r,i}$ and on rows greater than r on disks to the left of strip $S_{r,i}$. The only unavailable data strips required for this purpose can be located on disks $d_j$ and $d_k$. However, since disks $d_j$ and $d_k$ are located to the right of disk $d_i$, the required data strips would have been already reconstructed using the process described before arriving at strip $S_{r,i}$. Furthermore, the stepped parity strip required to reconstruct strip $S_{r,i}$ is either located on the corresponding stepped parity disks, or is located on a disk to the left of strip $S_{r,i}$, wherein the necessary disks are intact.

Similarly, the strips on data disks needed to reconstruct $S_{r,k}$ are in rows greater than r on disks to the right of strip $S_{r,k}$ and on rows less than r on disks to the left of strip $S_{r,k}$. The only unavailable data strips required for this purpose can be located on disks $d_i$ and $d_j$. However, since disks $d_i$ and $d_j$ are located to the left of disk $d_k$, the required data strips would have been already reconstructed using the described process before arriving at strip $S_{r,k}$. Furthermore, the diagonal parity strip required to reconstruct strip $S_{r,k}$ is either located on the corresponding diagonal parity disk or is located on a disk to the right of strip $S_{r,k}$, wherein the necessary disks are intact. Once the failed data disks are reconstructed, the strips on the failed diagonal parity disk of the first group can be restored using the reconstructed data on the disks. Finally, the parity strips on the disks $d_i$, $d_j$ and $d_k$ are reconstructed using the appropriate data strips that are intact.

b. Failed Diagonal Parity Disk of the Second Group

In the case of three failed disks, where one disk has a low index, one disk has an intermediate index and one disk has a high index, and a failed diagonal parity disk of the second group, data is reconstructed by starting at the strip on the lowest indexed stripe of the low index failed data disk, the strip on the lowest index stripe of the intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed, until reaching the data strip of the low index failed data disk having a stripe index equal to the intermediate failed disk index minus the low failed disk index. Then, the strip on the lowest index stripe of the intermediate index failed data disk is reconstructed using the corresponding stepped parity and the other members of the corresponding stepped parity set having the current data strip of the intermediate index failed data disk as the highest disk indexed member. Then the strip on the lowest indexed stripe of the high index failed data disk is recreated using the corresponding horizontal parity and the other members of the corresponding horizontal parity set.

From this point, the stripe indexes of each data strip are incremented and data is then recreated by alternately reconstructing the data strip of the low index failed data disk by using the corresponding diagonal parity and the other members of the corresponding diagonal parity of the first group. Then, the data strip of the intermediate index failed data disk is reconstructed by using the corresponding stepped parity and the other members of the corresponding stepped parity set having the data strip being reconstructed with a disk index greater than the other member of the same stepped parity set on the same stripe. Next, the data strip of the high index failed data disk is reconstructed by using the corresponding horizontal parity and the other members of the corresponding horizontal parity set. This process is repeated in a round robin manner until the data strips of the low index failed disk are reconstructed, whereupon the remaining strips on the intermediate indexed failed disk and the high indexed failed disk are iteratively reconstructed as described above. Once the failed data disks are reconstructed, the strips on the failed diagonal parity disk of the second group can be restored using the reconstructed data on the disks. Finally, the parity strips on the failed data disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, i<j<k. The data in each failed disk is reconstructed starting with strip $S_{1,i}$ using the parity information in the corresponding diagonal parity set of the first group. This is possible because all the disks contributing to the left diagonal parity set required to rebuild strip $S_{1,i}$ are located to the left of disk $d_i$, and are therefore guaranteed to be intact. Then, strips $S_{2,i}$, $S_{3,i}$, . . . $S_{j-i,i}$ are reconstructed using the corresponding left diagonal parity sets. The last strip that can be reconstructed on disk $d_i$ using the left diagonal parity set is $S_{j-i,i}$ because the left diagonal parity set containing strip $S_{j-i+1,i}$ would intersect with strip $S_{1,j}$ on disk $d_j$ which has not been recreated at this point. Therefore, strip $S_{1,j}$ is reconstructed using the stepped parity set that contains strip $S_{1,j}$ as its rightmost strip. This is possible because all the data disks contributing to the stepped parity set required to rebuild strip $S_{1,j}$ are located to the left of disk $d_j$ and, on any given data disk, a strip belonging to that stepped parity set has a row index equal to or lower than the strip belonging to the diagonal parity set of the first group used to recreate strip $S_{j-i,i}$. Next, strip $S_{1,k}$ is reconstructed using the horizontal parity set. Then, strip $S_{j-i+1,i}$ is reconstructed using the left diagonal parity information. Reconstruction of strip $S_{j-i+1,i}$ is possible because strip $S_{1,j}$, which is a member of the left diagonal parity set containing strip $S_{j-i+1,i}$, has already been recreated in the preceding steps. Next, strip $S_{2,j}$ is reconstructed using the corresponding stepped parity information, followed by the strip $S_{2,k}$ using the horizontal parity set. This technique is iterated for each failed disk $d_i$, $d_j$ and $d_k$ using the diagonal parity set of the first group, the stepped parity set, and the horizontal parity set, respectively. If and when the reconstruction of disk $d_i$ is completed prior to the others, the reconstruction of the remaining failed disk is accomplished using the iterative technique of reconstructing the remaining strips, first the lower indexed strip, then the higher indexed strip, on a row by row basis (i.e., for each remaining row after disk $d_i$ is completely restored, $d_j$ followed by $d_k$). Once the failed data disks are reconstructed, the strips on the failed diagonal parity disk of the second group can be restored using the reconstructed data on the disks. Finally, the parity strips on the disks $d_i$, $d_j$ and $d_k$ are reconstructed using the appropriate data strips that are intact.

3. Failed Horizontal Parity Disk

In the case of three failed disks, where one disk has a low index, one disk has an intermediate index and one disk has a high index, and a failed horizontal parity disk, data is reconstructed by starting at the strip on the lowest indexed stripe of the low index failed data disk, the strip on the lowest index stripe of the intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed until reaching the data strip of the low index failed data disk having a stripe index equal to the intermediate failed disk index minus the low failed disk index. Then, the strip on the lowest index stripe of the intermediate index failed data disk is reconstructed using the corresponding stepped parity and the other members of the corresponding stepped parity set having the current data strip of the intermediate index failed data disk as the highest disk indexed member. Next, the strip on the lowest indexed stripe of the high index failed data disk is recreated using the corresponding diagonal parity and the other members of the corresponding diagonal parity set of the second group.

From this point, the stripe indexes of each data strip are incremented and data is then recreated by alternately reconstructing the data strip of the low index failed data disk by using the corresponding diagonal parity and the other members of the corresponding stepped parity of the first group. Then, the data strip of the intermediate index failed data disk is reconstructed by using the corresponding stepped parity and the other members of the corresponding stepped parity set having the data strip being reconstructed with a higher disk index than the member in the same stepped parity set in the same stripe. Next, the data strip of the high index failed data disk is reconstructed by using the corresponding diagonal parity and the other members of the corresponding diagonal parity set of the second group. This process is repeated in a round robin manner until the data strips of the low index failed disk are reconstructed, whereupon the remaining strips intermediate indexed failed disk and the high indexed failed disk are iteratively reconstructed as described above. Once the failed data disks are reconstructed, the strips on the failed horizontal parity disk can be restored using the reconstructed data on the disks. Finally, the parity strips on the failed disks are reconstructed using the appropriate data strips that are intact.

In FIG. 3 for example, the disk having a low index is designated as $d_i$, the disk having the intermediate index is designated $d_j$, and the disk having the high index is designated $d_k$. Accordingly, $i<j<k$. The data in each failed disk is reconstructed starting with strip $S_{1,i}$ using the parity information in the corresponding diagonal parity set of the first group. This is possible because all the disks contributing to the diagonal parity set of the first group required to rebuild strip $S_{1,i}$ are located to the left of disk $d_i$, and are therefore intact. Then, strips $S_{2,i}$, $S_{3,i}$, ... $S_{j-i,i}$ are reconstructed using the corresponding diagonal parity sets of the first group. The last strip that can be reconstructed on disk $d_i$ using the diagonal parity set of the first group is $S_{j-i,i}$ because the left diagonal parity set containing strip $S_{j-i+1,i}$ would intersect with strip $S_{1,j}$ on disk $d_j$ which has not been recreated yet. Therefore, strip $S_{1,j}$ is reconstructed using the stepped parity set that contains strip $S_{1,j}$ as its rightmost strip. This is possible because all the data disks contributing to the stepped parity set required to rebuild strip $S_{1,j}$ are located to the left of disk $d_j$ and, on any given data disk, a strip belonging to the stepped parity set has a row index equal to or lower than the strip belonging to the diagonal parity set used to recreate strip $S_{j-i,i}$. Then, strip $S_{1,k}$ is reconstructed using the corresponding diagonal parity set of the second group. This is possible because all the disks contributing to the diagonal parity set of the second group containing strip $S_{1,k}$ are located to the right of disk $d_k$, and are therefore intact.

Next, strip $S_{j-i+1,i}$ is reconstructed using the diagonal parity information from the first group. At this point, the reconstruction of strip $S_{j-i+1,i}$ is possible since strip $S_{1,i}$ (a member of the diagonal parity set of the first group containing strip $S_{j-i+1,i}$) has already been recreated in the preceding steps. Then, strip $S_{2,j}$ is reconstructed using the corresponding stepped parity information, followed by the strip $S_{2,k}$ using the diagonal parity set of the second group.

This technique is iterated for each failed disk $d_i$, $d_j$ and $d_k$ using the diagonal parity set of the first group, the stepped parity set, and the diagonal parity set of the second group, respectively. If and when the reconstruction of disk $d_i$ is completed prior to the others, the reconstruction of the remaining failed disk is accomplished using the iterative technique of reconstructing the remaining strips, first the lower indexed strip, then the higher indexed strip, on a row by row basis (i.e., for each remaining row after disk $d_i$ is completely restored, $d_j$ followed by $d_k$). Once the failed data disks are reconstructed, the strips on the failed horizontal parity disk can be restored using the reconstructed data on the disks. Finally, the parity strips on the disks $d_i$, $d_j$ and $d_k$ are reconstructed using the appropriate data strips that are intact.

E. Failure of Four Data Disks

In the case of four failed disks, where one disk has a low index, one disk has a low intermediate index, one disk has a high intermediate index and one disk has a high index, data is reconstructed by starting at the strip on the lowest indexed stripe of the low index failed data disk, the strip on the lowest index stripe of the low intermediate index failed data disk, the strip on the lowest index stripe of the high intermediate index failed data disk, and the strip on the lowest indexed stripe of the high index failed data disk. Data is then recreated by sequentially reconstructing (incrementing the stripe index of the disk by 1 for each iteration) the data strips of the low index failed data disk by using the corresponding diagonal parity and the other members of the corresponding diagonal parity of the first group. The data strips are sequentially reconstructed until reaching the data strip of the low index failed data disk having a stripe index equal to the low intermediate failed disk index minus the low failed disk index. Then, the strip on the lowest index stripe of the low intermediate index failed data disk is reconstructed using the corresponding stepped parity and the other members of the corresponding stepped parity set having the data strip being reconstructed with a higher disk index than the other member of the same stepped parity set on the same stripe. Next, the strip on the lowest indexed stripe of the high index failed data disk is recreated using the corresponding diagonal parity and the other members of the corresponding diagonal parity set of the second group. Then, the strip on the lowest index stripe of the high intermediate index failed data disk is reconstructed using the corresponding horizontal parity and the other members of the corresponding horizontal parity set.

From this point, the stripe indexes of each data strip are incremented and data is then recreated by alternately reconstructing the data strip of the low index failed data disk by using the corresponding diagonal parity and the other members of the corresponding stepped parity of the first group. Then, the data strip of the low intermediate index failed data disk is reconstructed by using the corresponding stepped parity and the other members of the corresponding stepped parity set having the data strip being reconstructed with a higher disk index than the member of the same parity set on the same stripe. Next, the data strip of the high index failed data disk is reconstructed by using the corresponding diagonal parity and the other members of the corresponding diagonal parity set of the second group. Then, the data strip of the high intermediate index failed data disk is reconstructed using the corresponding horizontal parity and the other members of the corresponding horizontal parity set. This process is repeated in a fixed cyclic order until the data strips of the low index failed disk are reconstructed, whereupon the remaining strips of the low intermediate indexed failed disk, the high indexed failed disk, and the high intermediate indexed failed disk are iteratively reconstructed as described above. Finally, the parity strips on the failed disks are reconstructed using the appropriate data strips that are intact.

In FIG. 3 for example, the disk having a low index is designated as $d_i$, the disk having the low intermediate index is designated $d_j$, the disk having the high intermediate index is designated $d_k$, and the disk having the high index is designated $d_l$. Accordingly, i<j<k<l. The data in each failed disk is reconstructed starting with strip $S_{1,i}$ using the parity information in the corresponding diagonal parity set of the left group. This is possible because all the disks contributing to the left diagonal parity set required to rebuild strip $S_{1,i}$ are located to the left of disk $d_i$, and are therefore guaranteed to be intact. Then, reconstruct strips $S_{2,i}, S_{3,i}, \ldots S_{j-i,i}$ using the corresponding diagonal parity sets of the first group. The last strip that can be reconstructed on disk $d_i$ using diagonal parity sets of the first group is $S_{j-i,i}$ because the diagonal parity set of the first group containing strip $S_{j-i+1,i}$ would intersect with strip $S_{1,j}$ on disk $d_j$, which has not been recreated yet. Therefore, strip $S_{1,j}$ is reconstructed using the stepped parity set that contains strip $S_{1,j}$ as its rightmost strip. This is possible because all the data disks contributing to the stepped parity set required to rebuild strip $S_{1,j}$ are located to the left of disk $d_j$ and, on any given data disk, a strip belonging to that stepped parity set has a row index equal to or lower than the strip belonging to the diagonal parity set used to recreate strip $S_{j-i,i}$. Then, strip $S_{1,l}$ is reconstructed using the corresponding diagonal parity set of the second group. This is because all the disks contributing to the diagonal parity set of the second group required to rebuild strip $S_{1,l}$ are located to the right of disk $d_l$, and are therefore guaranteed to be intact. Then, strip $S_{1,k}$ is reconstructed using the horizontal parity set.

Next, strip $S_{j-i+1,i}$ is reconstructed using the diagonal parity information of the first group. Note that reconstruction of strip $S_{j-i+1,i}$ is possible at this point because strip $S_{1,j}$, which is a member of the diagonal parity set pf the first group containing strip $S_{j-i+1,i}$, has already been recreated in the preceding steps. Then, strip $S_{2,j}$ is reconstructed using the corresponding stepped parity information, followed by strips $S_{2,l}$ and $S_{2,k}$ using the corresponding diagonal parity set of the second group and horizontal parity set, respectively.

This technique is iterated for each failed disk $d_i$, $d_j$, $d_l$, and $d_k$ using the diagonal parity set of the first group, the stepped parity set, the diagonal parity set of the second group and the horizontal parity set respectively. If and when the reconstruction of disk $d_i$ is completed prior to the others, the reconstruction of the remaining failed disk is accomplished using the iterative technique of reconstructing the remaining strips, first the lower indexed strip, then the higher indexed strip, on a row by row basis (i.e., for each remaining row after disk $d_i$ is completely restored, $d_j$ followed by $d_l$ and then $d_k$). Finally, the parity strips on the disks $d_i$, $d_j$, $d_k$, and $d_l$ are reconstructed using the appropriate data strips that are intact.

Accordingly, a method and system for providing four simultaneous disk failures in a disk array is provided. By assembling horizontal, diagonal, and stepped parity sets and storing the corresponding parities in the array, an efficient scheme for providing up to four disk fault tolerance is realized independently of the size or format of the disk array.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of providing multiple disk fault tolerance in an array of independent disks organized into a plurality of stripes, each stripe comprising a plurality of strips, each of the strips being located on only a corresponding single disk, the method comprising:
   grouping strips containing data into a first group of a plurality of first parity sets, in which any one strip is included only once in any one of the first parity sets of the first group;
   grouping strips containing data into a second group of a plurality of second parity sets in an arrangement different from the first group by arranging strips in a stepped configuration for each second parity set such that each strip is a member of at least two of the second parity sets of the second group.

2. The method of claim 1, wherein when the strips are represented by an N disk by M stripe logical matrix of data and parity locations, the stepped configuration assuming a stair step pattern having a tread to riser ratio of at least two strips to one strip.

3. The method of claim 1, wherein the step of grouping strips containing data into a plurality of first parity sets comprises arranging strips into horizontal and diagonal parity sets.

4. A method of providing disk fault tolerance in an array of independent disks, wherein the disks are indexed and organized into a plurality of indexed stripes, each stripe further comprising a plurality of strips having a respective disk index and a respective stripe index, each of the strips being located on only a corresponding single disk, the method comprising:

arranging strips containing data into horizontal, diagonal, and stepped parity sets, the stepped parity sets comprising a pattern having a tread to riser ratio of at least two strips to one strip, wherein each parity set comprises at least one data strip as a member and no single data strip is repeated in any one parity set;

calculating a horizontal parity for each horizontal parity set;

calculating a diagonal parity for each diagonal parity set;

calculating a stepped parity for each stepped parity set;

storing each respective calculated horizontal parity of each horizontal parity set in a corresponding strip of a horizontal parity disk;

storing at least some of the calculated diagonal parities of each diagonal parity set in a respective one of a plurality of strips of a diagonal parity disk and storing a remainder of the calculated diagonal parities in a respective one of a plurality of strips in a diagonal parity stripe so that no members of a contributing diagonal parity set have the same disk index as the disk index of the respective one of a plurality of strips of the diagonal parity stripe; and storing at least some of the calculated stepped parities of each stepped parity set in a respective one of a plurality of strips of a stepped parity disk and storing a remainder of the calculated stepped parities in a respective one of a plurality of strips in a stepped parity stripe so that no members of the stepped parity set have the same disk index as the disk index of the respective one of the plurality of strips of the stepped parity stripe.

5. The method of claim 4, further comprising alternately storing the at least some of the calculated stepped parities in a first stepped parity disk reserved for storing only stepped parities and a second stepped parity disk reserved for storing only stepped parities.

6. The method of claim 4, wherein storing the remainder of the calculated stepped parities further comprises storing the remainder in a stepped parity stripe so that each respective stepped parity is stored in a strip of the stepped parity stripe having a smaller disk index than all contributing disk indexes of each data strip of the corresponding stepped parity set.

7. The method of claim 4, further comprising grouping the diagonal parity sets into a first group of diagonal parity sets and a second group of diagonal parity sets so that each data strip is a member of the first and second group.

8. The method of claim 4 further comprising:
reserving the horizontal parity disk to store horizontal parity;
reserving at least two diagonal parity disks to store diagonal parity;
reserving at least two diagonal parity stripes, across each of the disks in the array, to store diagonal parity;
reserving at least two stepped parity disks to store stepped parity;
reserving a stepped parity stripe, across each of the disks in the array, to store stepped parity; and
reserving the remaining unreserved strips in the remaining unreserved disks in the array for data.

9. The method of claim 4, wherein the step of arranging strips containing data into horizontal, diagonal, and stepped parity sets further comprises:
assembling horizontal parity sets across each stripe of the array containing data;
assembling diagonal parity sets across diagonals traversing the stripes in the array containing data; and
assembling stepped parity sets across stepped arrangements traversing the stripes in the array containing data.

10. The method of claim 9, wherein the step of assembling stepped parity sets further comprises:
establishing a first stepped parity set as a data strip having the lowest disk and stripe index;
establishing contiguous stepped parity sets by progressing in a higher disk index, higher stripe indexed direction through the array until the last stair step parity set formed is a data strip having the highest disk and highest stripe index.

11. The method of claim 4, wherein a lowest tread of a respective stepped parity set comprises a lowest disk indexed and a highest stripe indexed strip of the stepped parity set and a highest tread of the respective stepped parity set comprises a highest disk indexed and a lowest stripe indexed strip of the stepped parity set.

12. The method of claim 4, wherein the step of calculating the stepped parity further comprises calculating the stepped parity of data stored in each stepped parity set traversing stripes containing data in the array.

13. The method of claim 4, wherein calculating the horizontal, diagonal, and stepped parities for each parity set comprises computing the exclusive-or (XOR) of the information in each data strip of each parity set.

14. The method of claim 13, wherein calculating the stepped parity, $sP_i$, for each diagonal traversing the stripes containing data using the exclusive-or sum of the information in each diagonal is performed according to the equations:

$$sP_i = B_{1,i} \oplus B_{2,r-2} \oplus B_{3,r-4} \oplus \ldots B_{p,q} \text{ if } 1 \leq i \leq N,$$

$$sP_i = B_{r,t} \oplus B_{r+1,t-2} \oplus B_{r+2,t-4} \oplus \ldots B_{p,q} \text{ if } N < i \leq 2M,$$

$$sP_i = B_{r,t} \oplus B_{r+1,t-2} \oplus B_{r+2,t-4} \oplus \ldots B_{M,u} \text{ if } 2M < i < 2M+N-1$$

where i is an index counter for the number of stepped parity sets arranged in the array, N is the number of disks containing data in the array, M is the number of stripes containing data in the array, $$B_{i,k} = S_{i,k} \text{ if } k=1,$$

$$B_{i,k} = S_{i,k} \oplus S_{i,k-1} \text{ if } 1 < k \leq N,$$

$$B_{i,k} = S_{i,k-1} \text{ if } k = N+1,$$

$S_{i,k}$ is the information stored in strip i of disk k, p=(i+1)div 2, q=(i−1)mod 2+1, r=(i−N+2)div 2, t=N+(N+i)mod 2, and u=(i−2M)+2.

15. The method of claim 4, wherein the step of storing the calculated stepped parity for each stepped parity set further comprises alternately storing, beginning with the strip on the lowest indexed stripe, the calculated stepped parity, beginning with the first stepped parity set, in a strip of the first stepped parity disk; then storing the next calculated stepped parity in a strip of the second stepped parity disk, repeating the alternating storing process, and, when the stepped parity strip on the next to highest indexed stripe of the second stepped parity disk is filled, sequentially storing, beginning with the strip on the lowest indexed disk, the calculated stepped parity for the remaining stepped parity sets in the stepped parity stripe until the calculated stepped parities for each of the stepped parity sets have been stored.

16. The method of claim 4, further comprising reconstituting lost data on four or fewer concurrently failed disks by using the corresponding horizontal parities, diagonal parities, stepped parities and data stored on the disks.

17. The method of claim 16, wherein reconstructing the lost data comprises, in the case of a failed data disk and three failed parity disks:
- reconstructing each of the data strips of the failed data disk, starting with the strip on the lowest indexed stripe, by using the corresponding parity information from the intact parity disks, the parity information in the intact parity stripes, and the other intact data members of the corresponding parity sets; and
- reconstructing each of the parity strips of the failed parity disks and the parity strips on the failed data disks by using the intact data members of the corresponding parity sets.

18. The method of claim 16, wherein reconstructing the lost data comprises, in the case of two failed data disks, where one disk has a low index and one disk has a high index, a failed diagonal parity disk of the first group, and a failed diagonal parity disk of the second group:
- reconstructing each of the data strips of the failed data disks by starting at the strip on the lowest indexed stripe of the lower index failed data disk and the strip on the lowest indexed stripe of the higher index failed data disk;
- alternately reconstructing the data strip of the lower indexed failed data disk by using the corresponding intact stepped parity set that includes the data strip being reconstructed having a higher disk index than the other member of the same stepped parity set on the same stripe, then reconstructing the data strip of the higher indexed failed data disk using the corresponding horizontal parity and other members of the corresponding horizontal parity set, until each data strip of each of the failed disks is reconstructed;
- reconstructing each of the diagonal parity strips of the failed diagonal parity disks by using the members of the corresponding diagonal parity set; and
- reconstructing each of the parity strips of the failed data disks by using the members of the corresponding parity sets.

19. The method of claim 16, wherein reconstructing the lost data comprises, in the case of two failed data disk, where one disk has a low index and one disk has a high index, a failed diagonal parity disk of the second group, and a failed step parity disk:
- reconstructing each of the data strips of the failed data disks by starting at the strip on the lowest indexed stripe of the lower index failed data disk and the strip on the lowest indexed strips of the higher index failed data disk;
- alternately reconstructing the data strip of the lower indexed failed data disk by using the corresponding intact diagonal parity set of the first group and the other members of the corresponding diagonal parity set, then reconstructing the data strip of the higher indexed failed data disk by using the corresponding horizontal parity and the other members of the corresponding horizontal parity set, until each data strip of each of the failed disks is reconstructed;
- reconstructing each of the diagonal parity strips of the failed diagonal parity disk of the second group by using the members of the corresponding diagonal parity set;
- reconstructing each of the stepped parity strips of the failed stepped parity disk by using the members of the corresponding stepped parity set; and
- reconstructing each of the parity strips of the failed data disks by using the members of the corresponding parity sets.

20. The method of claim 16, wherein reconstructing the lost data comprises, in the case of two failed data disks, where one disk has a low index and one disk has a high index, a failed diagonal parity disk of the first group, and a failed step parity disk:
- reconstructing each of the data strips of the failed data disks by starting at the strip on the lowest indexed stripe of the lower index failed data disk and the strip on the lowest indexed stripe of the higher index failed data disk;
- alternately reconstructing the data strip of the higher indexed failed data disk by using the corresponding intact diagonal parity set of the second group and the other members of the corresponding diagonal parity set, then reconstructing the data strip of the lower indexed failed data disk by using the corresponding horizontal parity and the other members of the corresponding horizontal parity set, until each data strip of each of the failed disks is reconstructed;
- reconstructing each of the diagonal parity strips of the failed diagonal parity disk of the first group by using the members of the corresponding diagonal parity set;
- reconstructing each of the stepped parity strips of the failed stepped parity disk by using the members of the corresponding stepped parity set; and
- reconstructing each of the parity strips of the failed data disks by using the members of the corresponding parity sets.

21. The method of claim 16, wherein reconstructing the lost data comprises, in the case of two failed data disks where one disk has a low index and one disk has a high index, a failed diagonal parity disk of the first group, and a failed horizontal parity disk:
- reconstructing each of the data strips of the failed data disks by starting at the strip on the lowest indexed stripe of the lower index failed data disk and the strip on the lowest indexed stripe of the higher index failed data disk;
- alternately reconstructing the data strip of the higher indexed failed data disk by using the corresponding diagonal parity and the other members of the corresponding diagonal parity set of the second group, then reconstructing the data strip of the lower indexed failed data disk by using the corresponding stepped parity and the other members of the corresponding stepped parity set until each data strip of each of the failed disks is reconstructed;
- reconstructing each of the diagonal parity strips of the failed diagonal parity disk of the first group by using the members of the corresponding diagonal parity set;
- reconstructing each of the horizontal parity strips of the failed horizontal parity disk by using the members of the corresponding horizontal parity set; and
- reconstructing each of the parity strips of the failed data disks by using the members of the corresponding parity sets.

22. The method of claim 16, wherein reconstructing the lost data comprises, in the case of two failed data disks, where one disk has a low index and one disk has a high index, a failed stepped parity disk, and a failed horizontal parity disk:

reconstructing each of the data strips of the failed data disks by starting at the strip on the lowest indexed stripe of the lower index failed data disk and the strip on the lowest indexed stripe of the higher index failed data disk;

alternately reconstructing the data strip of the higher indexed failed data disk by using the corresponding diagonal parity and the other members of the corresponding diagonal parity set of the second group, then reconstructing the data strip of the lower indexed failed data disk by using the corresponding diagonal parity of the first group and the other members of the corresponding diagonal parity set, until each data strip of each of the failed disks is reconstructed;

reconstructing each of the stepped parity strips of the failed stepped parity disk by using the members of the corresponding stepped parity set;

reconstructing each of the horizontal parity strips of the failed horizontal parity disk by using members of the failed horizontal parity set; and reconstructing each of the parity strips of the failed data disks by using the members of the corresponding parity sets.

23. The method of claim 16, wherein reconstructing the lost data comprises, in the case of three failed data disks, where one disk has a low index, one disk has an intermediate index and one disk has a high index, and a failed stepped parity disk:

reconstructing each of the data strips of the failed data disks by starting at the strip on the lowest indexed stripe of the low index failed data disk, the strip on the lowest index stripe of the intermediate index failed data disk, and the strip on the lowest indexed stripe of the high index failed data disk;

reconstructing the data strip of the low index failed data disk by using the corresponding diagonal parity and the other members of the corresponding diagonal parity set of the first group, then reconstructing the data strip of the high index failed data disk by using the corresponding diagonal parity of the second group and the other members of the corresponding diagonal parity set, then reconstructing the data strip of the intermediate index failed data disk by using the corresponding horizontal parity and the other members of the corresponding horizontal parity set, in a round robin manner until each data strip of each of the failed disks is reconstructed;

reconstructing each of the stepped parity strips of the failed stepped parity disk by using the members of the corresponding stepped parity set; and reconstructing each of the parity strips of the failed data disks by using the members of the corresponding parity sets.

24. The method of claim 16, wherein reconstructing the lost data comprises, in the case of three failed data disks, where one disk has a low index, one disk has an intermediate index and one disk has a high index, and a failed diagonal parity disk of the first group:

reconstructing each of the data strips of the failed data disks by starting at the strip on the lowest indexed stripe of the low index failed data disk, the strip on the lowest index stripe of the intermediate index failed data disk, and the strip on the lowest indexed stripe of the high index failed data disk;

reconstructing the data strip of the low index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding diagonal parity and the other members of the corresponding diagonal parity set of the second group, then reconstructing the data strip of the intermediate index failed data disk by using the corresponding horizontal parity and the other members of the corresponding horizontal parity set, in a round robin manner until each data strip of each of the failed disks is reconstructed;

reconstructing each of the diagonal parity strips of the failed diagonal parity disk of the first group by using the members of the corresponding diagonal parity set; and reconstructing each of the parity strips of the failed data disks by using the members of the corresponding parity sets.

25. The method of claim 16, wherein reconstructing the lost data comprises, in the case of three failed data disks, where one disk has a low index, one disk has an intermediate index and one disk has a high index, and a failed diagonal parity disk of the second group:

reconstructing each of the data strips of the failed data disks by starting at the strip on the lowest indexed stripe of the low index failed data disk, the strip on the lowest index stripe of the intermediate index failed data disk, and the strip on the lowest indexed stripe of the high index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the intermediate failed disk index minus the low failed disk index;

reconstructing the strip on the lowest index stripe of the intermediate index failed data disk using the corresponding stepped parity and the other members of the corresponding stepped parity set having the data strip being reconstructed with a higher disk index than the other member of the same stepped parity set on the same stripe;

reconstructing the strip on the lowest indexed stripe of the high index failed data disk using the corresponding horizontal parity and the other members of the corresponding horizontal parity set;

reconstructing the data strip of the low index failed data disk by using the corresponding diagonal parity and the other members of the corresponding diagonal parity set of the first group, then reconstructing the data strip of the intermediate index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding horizontal parity and the other members of the corresponding horizontal parity set, in a fixed cyclic order until the data strips of the low index failed disk are reconstructed;

reconstructing the data strip of the intermediate index failed data disk by using the corresponding stepped parity and the other members of the corresponding stepped parity set having the data strip under reconstruction with a higher disk index than the other member of the same stepped parity set on the same stripe, then reconstructing the data strip of the high index failed data disk by using the corresponding horizontal parity and the other members of the corresponding horizontal parity set, in a round robin manner until the data strips of the intermediate index and the high index failed disks are reconstructed;

reconstructing each of the diagonal parity strips of the failed diagonal parity disk of the second group by using the members of the corresponding diagonal parity set; and reconstructing each of the parity strips of the failed data disks by using the members of the corresponding parity sets.

26. The method of claim 16, wherein reconstructing the lost data comprises, in the case of three failed data disks, where one disk has a low index, one disk has an intermediate index and one disk has a high index, and a failed horizontal parity disk:

reconstructing each of the data strips of the failed data disks by starting at the strip on the lowest indexed stripe of the low index failed data disk, the strip on the lowest index stripe of the intermediate index failed data disk, and the strip on the lowest indexed stripe of the high index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the intermediate failed disk index minus the low failed disk index, reconstructing the strip on the lowest index stripe of the intermediate index failed data disk using the corresponding stepped parity and the other members of the corresponding stepped parity set having the data strip being reconstructed with a higher disk index than the other member of the same stepped parity set on the same stripe;

reconstructing the strip on the lowest indexed stripe of the high index failed data disk using the corresponding diagonal parity and the other members of the corresponding diagonal parity set of the second group;

reconstructing the data strip of the low index failed data disk by using the corresponding diagonal parity and the other members of the corresponding diagonal parity of the first group, then reconstructing the data strip of the intermediate index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding diagonal parity and the other members of the corresponding diagonal parity set of the second group, in a round robin manner until the data strips of the low index failed disk are reconstructed;

reconstructing the data strip of the intermediate index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding diagonal parity and the other members of the corresponding diagonal parity set of the second group, in a fixed cyclic order until the data strips of the intermediate index and the high index failed disks are reconstructed;

reconstructing each of the horizontal parity strips of the failed horizontal parity disk by using the members of the corresponding horizontal parity set; and reconstructing each of the parity strips of the failed data disks by using the members of the corresponding parity sets.

27. The method of claim 16, wherein reconstructing the lost data comprises, in the case of four failed data disks, where one disk has a low index, one disk has a low intermediate index, one disk has a high intermediate index, and one disk has a high index:

reconstructing each of the data strips of the failed data disks by starting at the strip on the lowest indexed stripe of the low index failed data disk, the strip on the lowest index stripe of the low intermediate index failed data disk, the strip on the lowest index stripe of the high intermediate index failed data disk, and the strip on the lowest indexed stripe of the high index failed data disk;

sequentially reconstructing the data strips of the low index failed data disk by using the corresponding diagonal parity and the other members of the corresponding diagonal parity of the first group, until reaching the data strip of the low index failed data disk having a stripe index equal to the low intermediate failed disk index minus the low failed disk index;

reconstructing the strip on the lowest index stripe of the low intermediate index failed data disk using the corresponding stepped parity and the other members of the corresponding stepped parity set having the data strip being reconstructed with a higher disk index than the other member of the same stepped parity set on the same stripe;

reconstructing the strip on the lowest indexed stripe of the high index failed data disk using the corresponding diagonal parity and the other members of the corresponding diagonal parity set of the second group;

reconstructing the strip on the lowest indexed stripe of the high intermediate index failed data disk using the corresponding horizontal parity and the other members of the corresponding horizontal parity set;

reconstructing the data strip of the low index failed data disk by using the corresponding diagonal parity and the other members of the corresponding diagonal parity of the first group, then reconstructing the data strip of the low intermediate index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding diagonal parity and the other members of the corresponding diagonal parity set of the second group, then reconstructing the data strip of the high intermediate index failed data disk is reconstructed using the corresponding horizontal parity and the other members of the corresponding horizontal parity set, in a fixed cyclic order until the data strips of the low index failed disk are reconstructed;

reconstructing the data strip of the low intermediate index failed data disk by using the corresponding stepped parity and the other members of the corresponding stepped parity set having the data strip being reconstructed with a higher disk index than the other member of the same stepped parity set on the same stripe, then reconstructing the data strip of the high index failed data disk by using the corresponding diagonal parity and the other members of the corresponding diagonal parity set of the second group, then reconstructing the data strip of the high intermediate index failed data disk using the corresponding horizontal parity and the other members of the corresponding horizontal parity set, until the data strips of the low intermediate index, the high intermediate index, and the high index failed disks are reconstructed; and reconstructing each of the parity strips of the failed data disks by using the members of the corresponding parity sets.

28. A system for providing disk fault tolerance in an array of independent disks, comprising:
an array of disks consecutively indexed and organized into a plurality of indexed stripes, each stripe further comprising a plurality of strips having a respective disk index and a respective stripe index; and
an array controller coupled to the disk array and configured to:
a. group strips containing data into a first group of a plurality of first parity sets, in which any one strip is included only once in any one of the first parity sets; and
b. group strips containing data into a second group of a plurality of second parity sets in an arrangement different from the first group by arranging strips in a stepped configuration for each second parity set such that each strip is a member of at least two of the second parity sets of the second group.

29. The system of claim 28, wherein when the strips are represented by an N disk by M stripe logical matrix of data and parity locations, the stepped configuration assuming a stair step pattern having a tread to riser ratio of at least two strips to one strip.

30. The system of claim 28, wherein arranging strips containing data into a plurality of first parity sets comprises arranging strips into horizontal and diagonal parity sets.

31. A system for providing disk fault tolerance in an array of independent disks, comprising:
an array of disks consecutively indexed and organized into a plurality of indexed stripes, each stripe further comprising a plurality of strips having a respective disk index and a respective stripe index; and
an array controller coupled to the disk array and configured to:
a. arrange the strips containing data into horizontal, diagonal, and stepped parity sets, the stepped parity sets comprising a pattern having a tread to riser ratio of at least two strips to one strip, each set having at least one data strip as a member;
b. calculate the corresponding horizontal, diagonal, and stepped parities for each of the parity sets; and
c. store each of the calculated parities in a corresponding strip.

32. The system of claim 31, wherein the array controller is further configured to calculate a stepped parity for each stepped parity set, wherein a disk contributes at most one data strip to the calculation of a specific stepped parity.

33. The system of claim 31, wherein the array controller is further configured to store at least some of the calculated stepped parities of each stepped parity set in a respective one of a plurality of strips of a stepped parity disk and store a remainder of the calculated stepped parities in a respective one of a plurality of strips in a stepped parity stripe so that no members of a contributing stepped parity set have the same disk index as the disk index of the respective one of a plurality of strips of the stepped parity stripe.

34. The system of claim 33, further comprising alternately storing the at least some of the calculated stepped parities in a first stepped parity disk reserved for storing only stepped parities and a second stepped parity disk reserved for storing only stepped parities.

35. The system of claim 33, wherein storing the remainder of the calculated stepped parities further comprises storing the remainder in the stepped parity stripe so that each respective stepped parity is stored in a strip of the stepped parity stripe having a smaller disk index than all contributing disk indexes of each data strip of the corresponding stepped parity set.

36. The system of claim 31, wherein the array controller is further configured to calculate the horizontal, diagonal, and stepped parities for each parity set by computing the exclusive-or (XOR) of the information in each data strip of each parity set.

37. The system of claim 31 wherein the array controller is further configured to reserve the horizontal parity disk to store horizontal parity; to reserve at least two diagonal parity disks to store diagonal parity; to reserve at least two diagonal parity stripes to store diagonal parity; to reserve at least two stepped parity disks to store stepped parity; to reserve at least two stepped parity stripes to store stepped parity; and to reserve the remaining unreserved strips in the remaining unreserved disks in the array for data.

38. The system of claim 31, wherein the array controller is further configured to assemble horizontal parity sets across each stripe of the array containing data; to assemble diagonal parity sets across diagonals traversing the stripes in the array containing data; and to assemble stepped parity sets across the stripes in the array containing data.

39. The system of claim 38, wherein the array controller is further configured to establish a first stepped parity set as a data strip having the lowest disk and stripe index and establish contiguous stepped parity sets by progressing in a higher disk index, higher stripe indexed direction through the array until the last stair step parity set formed is a data strip having the highest disk and highest stripe index.

40. The system of claim 31 wherein a lowest tread of a respective stepped parity set comprises a lowest disk indexed and a highest stripe indexed strip of the stepped parity set and a highest tread of the respective stepped parity set comprises a highest disk indexed and a lowest stripe indexed strip of the stepped parity set.

41. The system of claim 31, wherein the array controller is further configured to calculate the stepped parity of data stored across each stepped parity set traversing stripes containing data in the array.

42. The system of claim 31, wherein the array controller is further configured to reconstitute lost data on four simultaneously failed disks in the array by using the corresponding stored horizontal, diagonal, and stepped parity information and the data stored on the remaining functional disks.

* * * * *